US012175948B2

(12) United States Patent
Liu

(10) Patent No.: US 12,175,948 B2
(45) Date of Patent: Dec. 24, 2024

(54) DATA DRIVING CIRCUIT AND DISPLAY DEVICE

(71) Applicant: Shenzhen China Star Optoelectronics Semiconductor Display Technology Co., Ltd., Guangdong (CN)

(72) Inventor: Fangyun Liu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/621,897

(22) PCT Filed: Oct. 25, 2021

(86) PCT No.: PCT/CN2021/125954
§ 371 (c)(1),
(2) Date: Dec. 22, 2021

(87) PCT Pub. No.: WO2023/039996
PCT Pub. Date: Mar. 23, 2023

(65) Prior Publication Data
US 2024/0212645 A1 Jun. 27, 2024

(30) Foreign Application Priority Data
Sep. 16, 2021 (CN) ......................... 202111087660.4

(51) Int. Cl.
*G09G 3/36* (2006.01)

(52) U.S. Cl.
CPC ......... *G09G 3/3685* (2013.01); *G09G 3/3607* (2013.01); *G09G 2310/0248* (2013.01); *G09G 2330/021* (2013.01)

(58) Field of Classification Search
CPC ............... G09G 3/3614; G09G 3/3688; G09G 2310/0251
See application file for complete search history.

(56) References Cited

U.S. PATENT DOCUMENTS

2006/0001630 A1 1/2006 Chen
2006/0262069 A1* 11/2006 Do ....................... G09G 3/3688 345/98

(Continued)

FOREIGN PATENT DOCUMENTS

CN 101465108 A 6/2009
CN 101968951 A 2/2011

(Continued)

OTHER PUBLICATIONS

CN101968951A Time sequence controller, display and charge sharing function control method thereof (Year: 2009).*

(Continued)

*Primary Examiner* — Van N Chow
(74) *Attorney, Agent, or Firm* — Nathan & Associates; Menachem Nathan

(57) ABSTRACT

A data driving circuit and a display device are provided in the present application. In the present application, a comparison module of a charge sharing unit module is connected to a latch module for comparing a digital video data stored in a corresponding pair of data driving units, a switching transistor is connected output terminals of the corresponding pair of the data driving units, an output terminal of the comparison module is connected to an control terminal of the switching transistor for turning on the switching transistor while a grayscale value of the digital video data being greater than a default grayscale value, so that the output terminals of the corresponding pair of the data driving units are connected for charge sharing.

13 Claims, 8 Drawing Sheets

(56) References Cited

U.S. PATENT DOCUMENTS

| | | | | |
|---|---|---|---|---|
| 2010/0156885 | A1* | 6/2010 | Cho | G09G 3/3688 345/87 |
| 2010/0289791 | A1* | 11/2010 | Weng | G09G 3/3688 345/213 |
| 2011/0227959 | A1 | 9/2011 | Chiba | |
| 2015/0310824 | A1* | 10/2015 | Yang | G09G 5/006 345/213 |
| 2017/0103723 | A1* | 4/2017 | Chen | G09G 3/3677 |

FOREIGN PATENT DOCUMENTS

| | | | |
|---|---|---|---|
| CN | 102054416 | A | 5/2011 |
| CN | 102136244 | A | 7/2011 |
| CN | 102262850 | A | 11/2011 |
| CN | 102592552 | A | 7/2012 |
| CN | 103366670 | A | 10/2013 |
| CN | 103680436 | A | 3/2014 |
| CN | 107331362 | A | 11/2017 |
| CN | 112509532 | A | 3/2021 |
| CN | 112967693 | A | 6/2021 |
| CN | 112992098 | A | 6/2021 |
| KR | 20100051945 | A | 5/2010 |
| KR | 20150029981 | A | 3/2015 |

OTHER PUBLICATIONS

CN102136244A Data drive circuit of display device and data line charge sharing method (Year: 2011).*

* cited by examiner

DATA DRIVING CIRCUIT AND DISPLAY DEVICE

This application claims priority to Chinese Patent Application No. 202111087660.4, filed with the Chinese Patent Office on Sep. 16, 2021, and entitled "DATA DRIVING CIRCUIT AND DISPLAY DEVICE", the entire content of which is incorporated herein by reference.

TECHNICAL FIELD

The present application relates to a technical field of display panels, and in particular to a data driving circuit and a display device.

BACKGROUND

In a common liquid crystal display, an improvement in power consumption of a data driving chip may employ an improvement in internal circuitry, such as charge sharing function, which also improves temperature of a chip. However, during actual operation of a liquid crystal display, a proportion of a heavy load picture is not high, therefore, the improvement in the power consumption and the temperature of the data driving chip are limited, and only limited heat dissipation improvement can be provided even if a heat dissipation pad is applied to an outside of the chip.

Therefore, solutions to problems of the power consumption and heat generation of the chip of the liquid crystal display are urgently needed.

Technical Problems

An embodiment of the present application provides a data driving circuit and a display device to solve problems of power consumption and heat generation of a chip of a display panel in prior art.

SUMMARY

An embodiment of the present application provides a data driving circuit, wherein the data driving circuit comprises a plurality of cascaded data driving units and a plurality of charge sharing units, a data driving unit is configured to receive a digital video data and output an analog video signal to a corresponding data line, the data driving unit at each stage comprises a latch module configured to store the digital video data, the plurality of cascaded data driving units are paired for providing a polarity inversed analog video signal, the charge sharing unit is disposed between each pair of the data driving units, each of the plurality of charge sharing units comprises a comparison module and a switching transistor, the comparison module is connected to latch modules of a corresponding pair of data driving units and configured to compare the digital video data stored in the corresponding pair of the data driving units, the switching transistor is connected to output terminals of the corresponding pair of the data driving units, and an output terminal of the comparison module is connected to a control terminal of the switching transistor.

In a data driving circuit of some embodiments of the present application, the comparison module comprises two comparators, a default grayscale value is input to inverting input terminals of the two comparators, and non-inverting input terminals of the two comparators are respectively connected to the corresponding pair of the data driving units.

In a data driving circuit of some embodiments of the present application, the comparison module further comprises an OR gate and two inverters, output terminals of the two comparators are respectively connected to two input terminals of the OR gate through the inverters, and output terminals of the OR gate are connected to the control terminal of the switching transistor.

In a data driving circuit of some embodiments of the present application, the comparison module further comprises an AND gate and two inverters, output terminals of the two comparators are respectively connected to two input terminals of the AND gate through the inverters, and output terminals of the AND gates are connected to the control terminal of the switching transistor.

In a data driving circuit of some embodiments of the present application, the comparison module is configured to compare two digital video data stored in the corresponding pair of the data driving units, and the comparison module turns on the switching transistor if a grayscale value of one of the digital video data is greater than a default grayscale value.

In a data driving circuit of some embodiments of the present application, the comparison module is configured to compare two digital video data stored in the corresponding pair of the data driving units, and the comparison module turns on the switching transistor if grayscale values of the two digital video data are greater than the default grayscale value.

In a data driving circuit of some embodiments of the present application, the comparison module is configured to, if none of the grayscale values of the digital video data is greater than the default grayscale value, turn off the switching transistor, and the output terminals of the corresponding pair of the data driving units do not perform charge sharing.

In another aspect, the present application provides a display device comprising:

a control unit; and a display panel including a pixel array and a data driving circuit; wherein the control unit is connected to the data driving circuit for providing a digital video data, the data driving circuit is connected to the pixel array for providing an analog video signal to the pixel array, the data driving circuit comprises a plurality of cascaded data driving units and a plurality of charge sharing units; wherein a data driving unit is configured to receive a digital video data and output an analog video signal to a corresponding data line, the data driving unit at each stage comprises a latch module for storing the digital video data, the plurality of cascaded data driving units are paired for providing a polarity inversed analog video signal, the charge sharing unit is disposed between each pair of the data driving units, each of the plurality of charge sharing units comprises a comparison module and a switching transistor, the comparison module is connected to latch modules of a corresponding pair of data driving units and configured to compare the digital video data stored in the corresponding pair of the data driving units, the switching transistor is connected to output terminals of the corresponding pair of the data driving units, and an output terminal of the comparison module is connected to a control terminal of the switching transistor.

In a display device of some embodiments of the present application, the comparison module comprises two comparators, inverting input terminals of the two comparators are input with a default grayscale value, and non-inverting input terminals of the two comparators are respectively connected to the corresponding pair of the data driving units.

In a display device of some embodiments of the present application, the charge sharing unit further comprises a starting module connected between the comparison module and the switching transistor, and the control unit is configured to control the starting module to turn on at an output interval of the analog video signal.

In a display device of some embodiments of the present application, the comparison module further comprises an OR gate and two inverters, output terminals of the two comparators are respectively connected to two input terminals of the OR gate through the inverters, and output terminals of the OR gate are connected to the control terminal of the switching transistor.

In a display device of some embodiments of the present application, the comparison module further comprises an AND gate and two inverters, output terminals of the two comparators are respectively connected to two input terminals of the AND gate through the inverters, and output terminals of the AND gates are connected to the control terminal of the switching transistor.

In a display device of some embodiments of the present application, the comparison module is configured to compare two digital video data stored in the corresponding pair of the data driving units, and the comparison module turns on the switching transistor if a grayscale value of one of the digital video data is greater than a default grayscale value.

In a display device of some embodiments of the present application, the comparison module is configured to compare two digital video data stored in the corresponding pair of the data driving units, and the comparison module turns on the switching transistor if grayscale values of the two digital video data are greater than the default grayscale value.

In a display device of some embodiments of the present application, the comparison module is configured to, if none of the grayscale values of the digital video data is greater than the default grayscale value, turn off the switching transistor, and the output terminals of the corresponding pair of the data driving units do not perform charge sharing.

Beneficial Effects

The present application has the following advantageous effects: a data driving circuit and a display device provided in the present application, by connecting a comparison module of a charge sharing unit module to a latch module and compare a digital video data stored in a corresponding pair of data driving units; connecting a switching transistor to output terminals of the corresponding pair of the data driving units, connecting an output terminal of the comparison module to a control terminal of the switching transistor for turning on the switching transistor while a grayscale value of the digital video data being greater than a default grayscale value so as to connect the output terminals of the corresponding pair of the data driving units for charge sharing; achieves that the switching transistor does not operate excessively and can provide more efficient power consumption control, thereby solving a problem of a power consumption and a heat generation of a chip in prior art.

BRIEF DESCRIPTION OF THE DRAWINGS

The technical solutions and other beneficial effects of the present application will be apparent from the detailed description of the specific embodiments of the present application with reference to the accompanying drawings.

DETAILS DESCRIPTION OT THE EMBODIMENTS

Figure 1A:
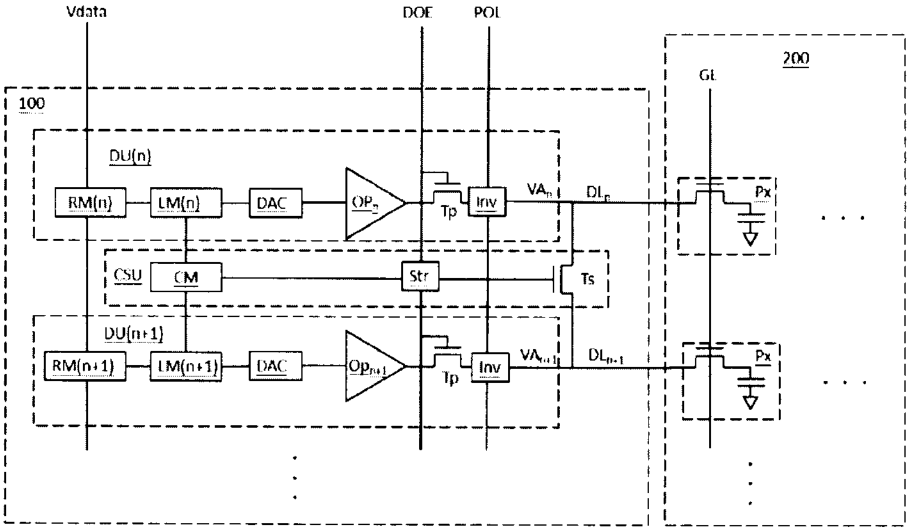
FIG. 1*a* is a block schematic diagram of a data driving circuit according to an embodiment of the present application.

The specific structural and functional details disclosed herein are representative only and are for the purpose of describing exemplary embodiments of the present application. However, the present application may be embodied in many alternative forms and should not be construed as being limited only to the embodiments set forth herein.

In the description of this application, it should be understood that orientations or positions indicated by the terms "center", "transverse", "upper", "lower", "left", "right", "vertical", "horizontal", "top", "bottom", "inner", "outer" and other are based on orientations or positions shown in the drawings, which is only for the convenience of describing the application and simplifying the description, and does not indicate or imply that the device or element referred to must have a specific orientation, be constructed and operated in a specific orientation, therefore, it cannot be understood as a restriction on this application. In addition, the terms "first" and "second" are only used for descriptive purposes and cannot be understood as indicating or implying relative importance or implicitly indicating the number of indicated technical features. Thus, the features defined with "first" and "second" may explicitly or implicitly include one or more of these features. In the description of this application, unless otherwise specified, "plurality" means two or more. In addition, the term "including", and any variations thereof is intended to cover non-exclusive inclusion.

In the description of the present application, it should be noted that the terms "mount", "link", "connect" are widely explained unless otherwise specified and restricted, for example, may be explained as a support connection, a detachable connection or an integrated connection; may be explained as a mechanical connection or an electrical connection; may be explained as directly connection or indirectly connection by an intermediate medium, which may be a communication between the two elements. The specific meaning of the above terms in this application may be understood by a person of ordinary skill in the art.

The terms used herein are only for describing specific embodiments and are not intended to limit the exemplary embodiments. Unless the context clearly dictates otherwise, the singular forms "a" and "one" used herein are also intended to include the plural. It should also be understood that the terms "including" and/or "comprising" used herein specify the existence of the stated features, integers, steps, operations, units and/or components, and do not exclude the existence or addition of one or more other features, integers, steps, operations, units, components, and/or combinations thereof.

This application will be further described with reference to the accompanying drawings and embodiments.

Referring to FIG. 1*a*, an embodiment of the present application provides a data driving circuit 100. The data driving circuit 100 includes a plurality of cascaded data driving units DU(n), DU(n+1), . . . , and a plurality of charge sharing units CSU; wherein the data driving units DU(n), DU(n+1), . . . is for receiving a digital video data Vdata and output analog video signals $VA_n$, $VA_{n+1}$, . . . to corresponding data lines $DL_n$, $DL_{n+1}$, . . . . Data driving unit DU(n) at each stage includes a latch modules LM(n) for storing the digital video data Vdata. The plurality of cascaded data driving units DU(n), DU(n+1), . . . are paired to provide polarity inversed analog video signals $VA_n$, $VA_{n+1}$, . . . . A charge sharing unit CSU is provided between each pair of the data driving units DU(n), DU(n+1), and each charge sharing unit CSU includes a comparison module CM and a switching transistor Ts. The comparison module CM is connected to latch modules LM(n), LM(n+1) of a corresponding pair of data driving units DU(n), DU(n+1) and for comparing the digital video data Vdata stored in the corresponding pair of the data driving units DU(n), DU(n+1). The switching transistor Ts connects output terminals of the corresponding pair of the data driving units DU(n), DU(n+1), and an output terminal of the comparison module CM connects to a control terminal of the switching transistor Ts.

Figure 1B:
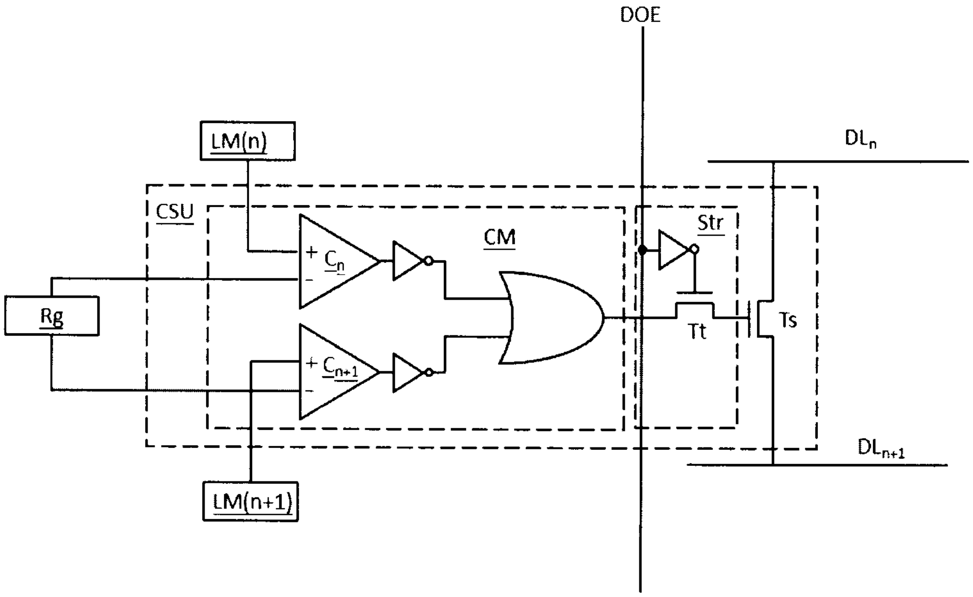
FIG. 1*b* is a block schematic diagram of a charge sharing unit according to an embodiment of the present application.

Referring to FIG. 1*b*, in a data driving circuit of some embodiments of the present application, the comparison module CM includes two comparators $C_n$ and $C_{n+1}$, a default grayscale value Rg is input to inverting input terminals of the two comparators $C_n$ and $C_{n+1}$, and non-inverting input terminals of the two comparators $C_n$ and $C_{n+1}$ are respectively connected to latch modules LM(n) and LM(n+1).

Referring to FIG. 1*b*, in a data driving circuit of some embodiments of the present application, the comparison module CM further includes an OR gate and two inverters. Output terminals of the two comparators $C_n$ and $C_{n+1}$ are respectively connected to two input terminals of the OR gate through the inverters, and output terminals of the OR gate are connected to a control terminal of the switching transistor Ts.

In a data driving circuit of some embodiments of the present application, the comparison module CM is configured to compare two digital video data Vdata stored in the corresponding pair of the data driving units DU(n), DU(n+1), and if a grayscale value of one of the digital video data Vdata is greater than the default grayscale value, the comparison module CM turns on the switching transistor Ts during an output interval of the analog video signals $VA_n$, $VA_{n+1}$ to connect the output terminals of the corresponding pair of the data driving units DU(n), DU(n+1) for charge sharing.

Figure 2A:
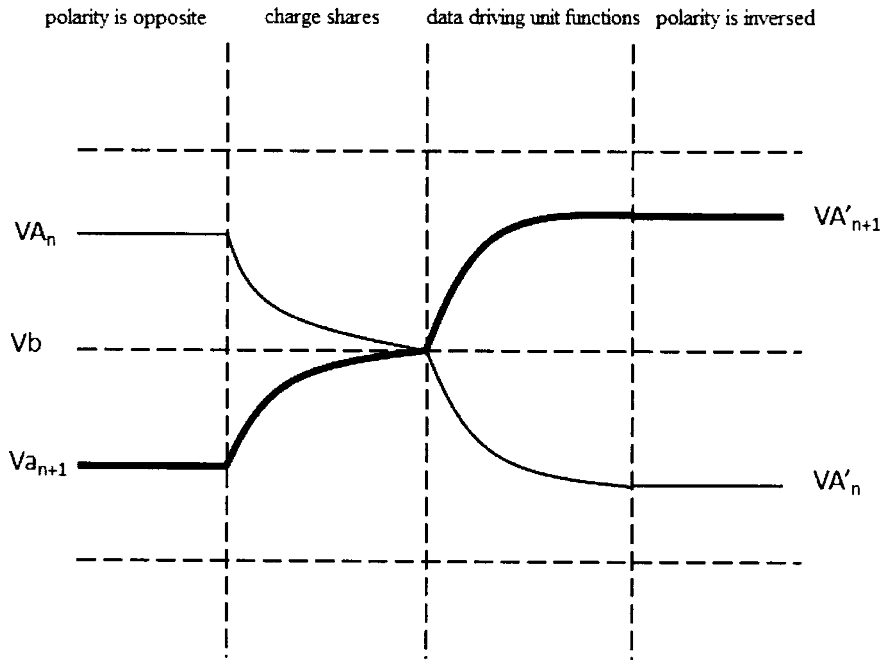
FIG. 2*a* is a signal timing diagram illustrating a charge sharing technique of a data driving circuit.

Referring to FIG. 2*a*, specifically, polarity inversed analog video signals $VA_n$ and $VA_{n+1}$ have opposite polarities, and each pulse signal inverts polarity to avoid parasitic capacitance problems between data lines or pixels. If the output terminals of the corresponding pair of the data driving units DU(n), DU(n+1) are connected between pulse signals of the analog video signals $VA_n$ and $VA_{n+1}$, a potential of two output terminals reaches an equilibrium potential Vb. A potential change in this stage does not require an active work of the data driving units DU(n), DU(n+1), and therefore energy is not consumed. However, the charge sharing unit CSU still needs to work, so it consumes energy and generates heat. In a next stage, the data driving units DU(n), DU(n+1) provide pulses with inverted polarity, and it is only necessary to raise a potential of two output terminals from the equilibrium potential Vb to new analog video signals $VA'_n$, $VA'_{n+1}$. Therefore, the data driving units DU(n), DU(n+1) only work actively from the equilibrium potential Vb to the new analog video signal $VA'_n$ and from the equilibrium potential Vb to the new analog video signal $VA'_{n+1}$.

Figure 2B:
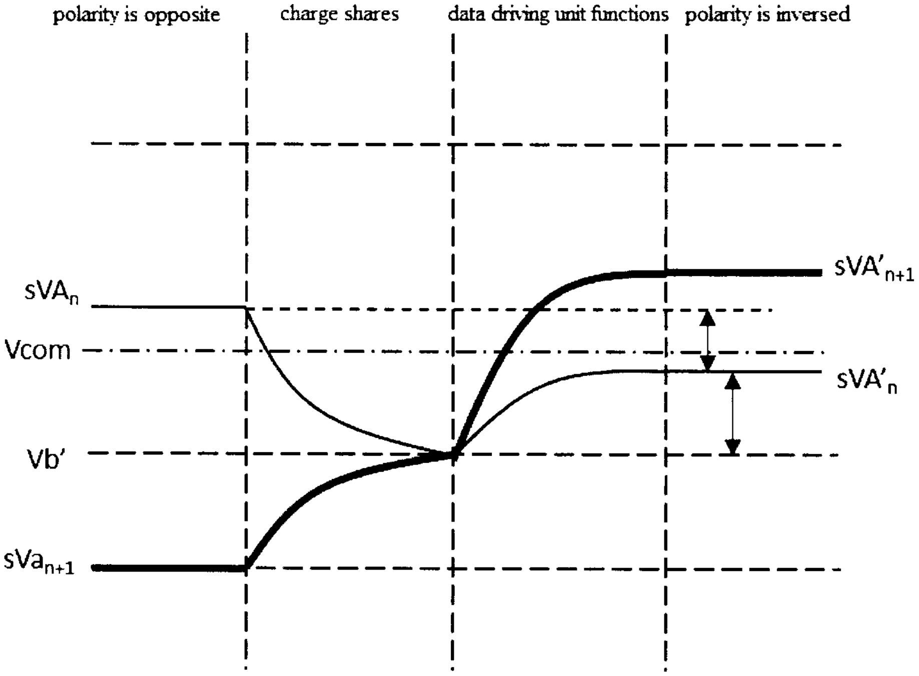
FIG. 2*b* is a signal timing diagram of charge sharing of a data driving circuit in prior art.

Referring to FIG. 2*b*, if a new analog video signal $sVA'_n$ is small, a case of FIG. 2*b* may occur, that is, an equilibrium potential Vb' is greater than the new analog video signal $sVA'_n$, and $sVA'_n - Vb' > sVA_n - sVA'_n$. In this case, the charge sharing does not help to reduce a power consumption of the data driving unit DU(n). In an actual operation of the display, a proportion of a heavy load picture is not high, and if charge sharing is performed every time a polarity of the analog video signal is inversed, an effect of saving energy is limited, and energy consumption of the charge sharing unit CSU is increased, resulting in an increase of an energy consumption of a whole chip, making a condition of heat generation worse. In addition, Vcom denotes a common potential of polarity inversion. Polarities of the analog video signal $sVA_n$ and the analog video signal $sVA_{n+1}$ being opposite means that the analog video signal $sVA_n$ is greater than the common potential Vcom and the analog video signal $sVA_{n+1}$ is less than the common potential Vcom. Polarities of the analog video signal $sVA_n$ and the new analogue video signal $sVA'_n$ being inversed means a state where the analog video signal $sVA_n$ is greater than the common potential Vcom transitions to a state where the new analog video signal $sVA'_n$ is less than the common potential Vcom.

Figure 2C:
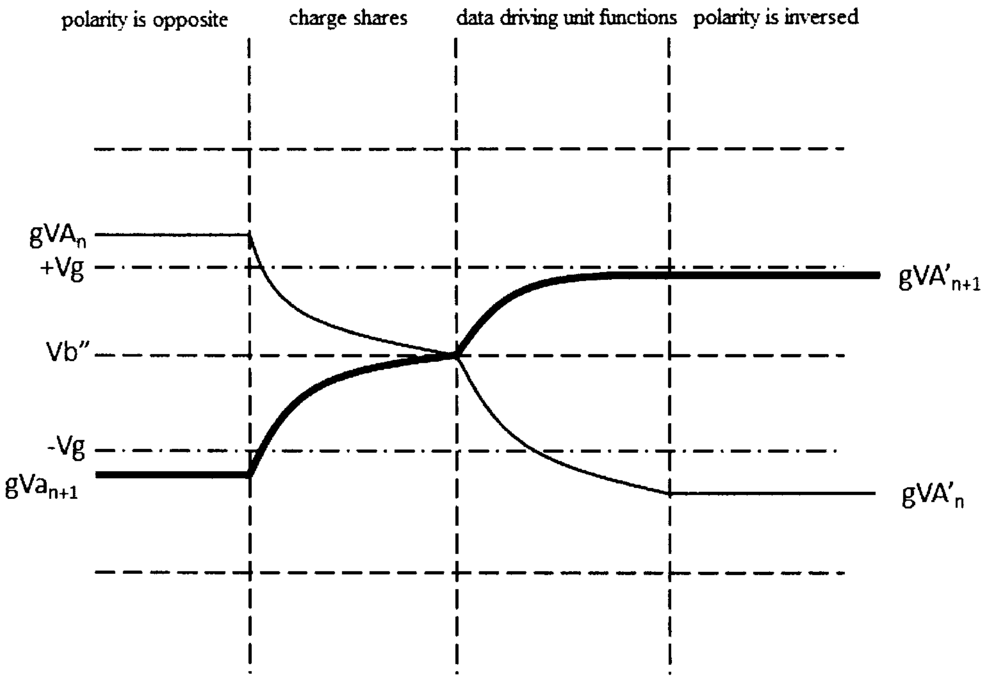
FIG. 2*c* is a signal timing diagram of charge sharing of a data driving circuit according to an embodiment of the present application.

Therefore, referring to FIG. 2*c*, in a data driving circuit of some embodiments of the present application, the comparison module CM is configured such that if a grayscale value of one of the digital video data Vdata is greater than the default grayscale value, the comparison module CM turn on the switching transistor Ts during an output interval of analog video signals $gVA_n$ and $gVA_{n+1}$ so that the output terminals of the corresponding pair of the data driving units DU(n), DU (n+1) are connected for charge sharing. Wherein, ±Vg is a potential of the analog video signal corresponding to the default grayscale value. In an example of FIG. 2*c*, a grayscale value of the analog video signal $gVA_n$ is greater than the default grayscale value, and a pulse amplitude corresponding to the potential $gVA'_n$ is greater than −Vg. Therefore, charge sharing helps to reduce the power consumption of the data driving units DU(n), DU(n+1), so that a switching transistor of the charge sharing unit CSU does not operate excessively and provides more efficient power consumption control, thereby solving a problem of power consumption and heat generation of a chip in prior art.

Specifically, if the default grayscale value is too small, the switching transistor of the charge sharing unit CSU is excessively operated. If the default grayscale value is too large, then it does not help reduce the power consumption of the data driving units DU(n) and DU(n+1). Therefore, a range of the default grayscale value ranging from a grayscale 128 to a grayscale 196 can be selected to achieve a better balance and a lower heat generation.

Figure 1C:
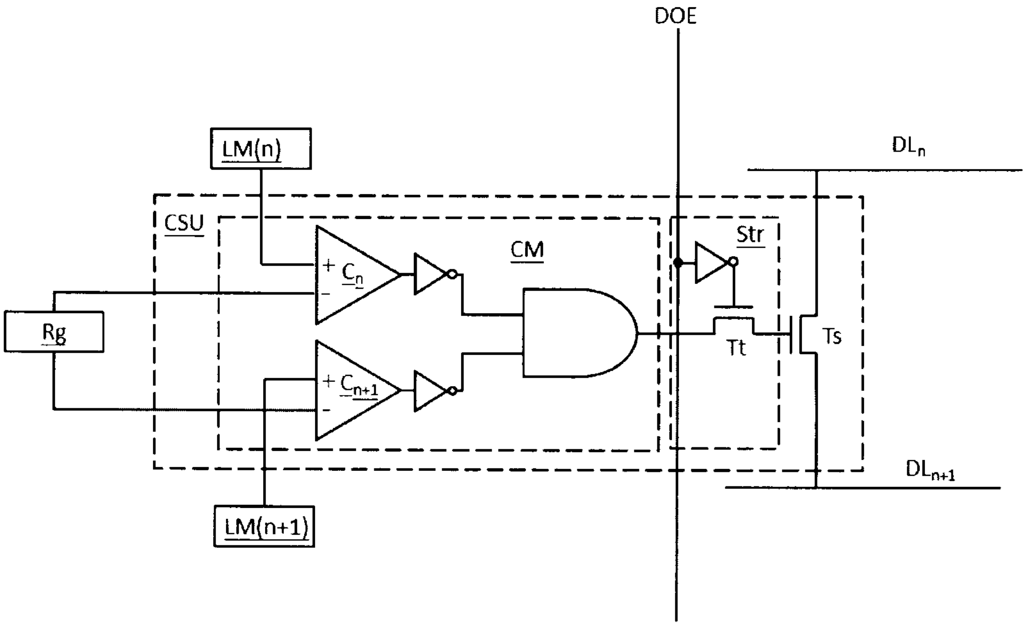
FIG. 1*c* is a block schematic diagram of a charge sharing unit according to another embodiment of the present application.

Referring to FIG. 1*c*, in a data driving circuit of some embodiments of the present application, the comparison module CM further includes an AND gate and two inverters. Output terminals of the two comparators $C_n$ and $C_{n+1}$ are respectively connected to two input terminals of the AND gate through the inverters, and output terminals of the AND gate are connected to the control terminal of the switching transistor Ts.

Figure 2D:
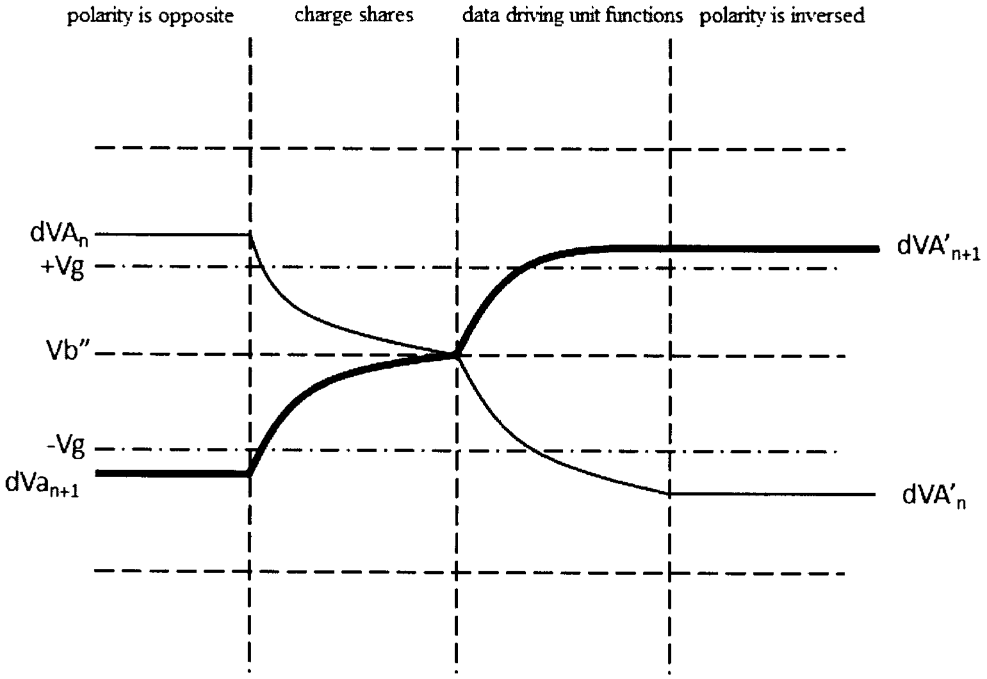
FIG. 2*d* is a signal timing diagram of charge sharing of a data driving circuit according to another embodiment of the present application.

Referring to FIG. 2*d*, in s data driving circuit of some embodiments of the present application, the comparison module CM is configured to compare two digital video data Vdata stored in the corresponding pair of the data driving units DU(n) and DU(n+1). If grayscale values of two digital video data Vdata are greater than the default grayscale value, the comparison module CM turns on the switching transistor Ts at an output interval of the analog video signals $dVA_n$ and $dVA_{n+1}$ so that the output terminals of the corresponding pair of the data driving units DU(n) and DU(n+1) are connected for charge sharing. Wherein, ±Vg is a potential of the analog video signal corresponding to the default grayscale value. In an example of FIG. 2*d*, the grayscale values of the analog video signals $dVA_n$ and $dVA_{n+1}$ are greater than the default grayscale value, and pulse amplitudes of corresponding potentials $dVA'_n$ and $dVA'_{n+1}$ are greater than ±Vg. Therefore, charge sharing helps to reduce the power consumption of the data driving units DU(n), DU(n+1), so that a switching transistor of the charge sharing unit CSU can be better avoided from operating excessively and can provide more efficient power consumption control, thereby solving a problem of power consumption and heat generation of a chip in prior art.

In a data driving circuit of some embodiments of the present application, the comparison module CM is configured such that if none of the grayscale values of the digital video data Vdata is greater than the default grayscale value, the comparison module CM turns off the switching transistor Ts, and output terminals of the corresponding pair of the data driving units DU(n), Du(n+1) do not share charge.

In a data driving circuit of some embodiments of the present application, the comparison module CM is configured to share charge at an interval before two analog video signals $VA_n$, $VA_{n+1}$ are output. Specifically, referring to FIG. 1*a*, the data driving unit DU(n) at each stage includes a register module RM(n) for receiving a digital video data Vdata, a digital-to-analog conversion module DAC for converting the digital video data Vdata into a simulation signal, an operational amplifier $OP_n$ for providing output impedance and circuit buffering, and an output transistor Tp for controlling synchronous outputs of the analog video signals $VA_n$, $VA_{n+1}$. Wherein, a data output enable signal DOE controls the output transistor Tp to perform synchronous outputs of the analog video signals $VA_n$, $VA_{n+1}$. Between two pulses of the data output enable signal DOE, the comparison module CM samples the analog video signals $VA_n$, $VA_{n+1}$ and determines whether to perform charge sharing. If the comparison module CM determines to perform charge sharing, the switching transistor Ts is turned on for charge sharing before sampled analog video signals $VA_n$, $VA_{n+1}$ is output.

In a data driving circuit 100 of some embodiments of the present application, the data driving unit DU(n) at each stage further includes an inverter Inv for inversing the polarity of the analog video signal $VA_n$. Specifically, the inverter Inv inverses the polarity of the analog video signals $VA_n$, $VA_{n+1}$ based on an inversed signal POL.

In the data driving circuit according to the above-described embodiment of the present application, by setting the comparison module of the charge sharing unit to compare the two digital video data stored in the corresponding pair of the data driving units, if the grayscale value of one of the digital video data is greater than the default grayscale value, the comparison module turns on the switching transistor at the output interval of the analog video signal to connect the output terminals of the corresponding pair of the data driving units for charge sharing, so that the switching transistor does not excessively operate and provides more efficient power consumption control, thereby solving a problem of power consumption and heat generation of a chip in prior art.

Figure 3:
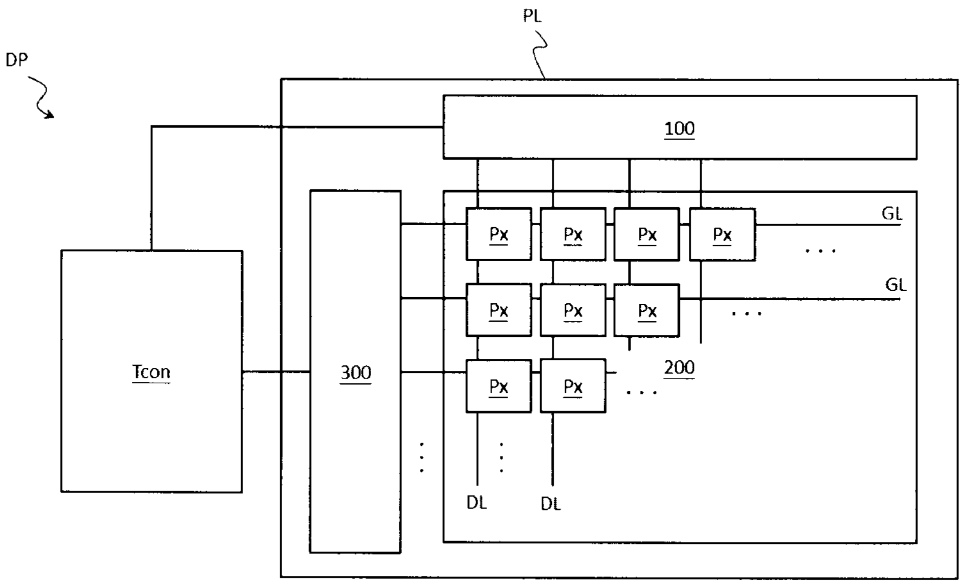
FIG. 3 is a block schematic diagram of a display device according to an embodiment of the present application.

Referring to FIGS. 1*a* and 3, in another aspect, the present application provides a display device DP, including:

a control unit Tcon; and a display panel PL including a pixel array 200 and a data driving circuit 100; wherein the control unit Tcon is connected to the data driving circuit 100 for providing digital video data Vdata, the data driving circuit 100 is connected to the pixel array 200 for providing an analog video signal $VA_n$ to the pixel array 200, and the data driving circuit 100 includes a plurality of cascaded data driving units DU(n), DU(n+1), . . . , and a plurality of charge sharing units CSU; wherein the data driving units DU(n), DU(n+1), . . . is for receiving a digital video data Vdata and output analog video signals $VA_n$, $VA_{n+1}$, . . . to corresponding data lines $DL_n$, $DL_{n+1}$, . . . , the data driving unit DU(n) at each stage includes a latch modules LM(n) for storing the digital video data Vdata, the plurality of cascaded data driving units DU(n), DU(n+1), . . . are paired in pairs to provide polarity inversed analog video signals $VA_n$, $VA_{n+1}$, . . . , a charge sharing unit CSU is provided between each pair of the data driving units DU(n), DU(n+1), each charge sharing unit CSU includes a comparison module CM and a switching transistor Ts, the comparison module CM is connected to latch modules LM(n), LM(n+1) of a corresponding pair of the data driving units DU(n), DU(n+1) and for comparing the digital video data Vdata stored in the corresponding pair of the data driving units DU(n), DU(n+1), the switching transistor Ts connects output terminals of each pair of the data driving units DU(n), DU(n+1), and an output terminal of the comparison module CM connects to a control terminal of the switching transistor Ts.

Specifically, the control unit Tcon is connected to the data driving circuit 100 to provide a digital video data Vdata in sequence (Serial Signal, or serial), which contains grayscale data required for each pixel (sub-pixel). The grayscale data is presented in a form of digital data at this stage. For the plurality of cascaded data driving units DU(n), DU(n+1), . . . , desired digital video data Vdata is intercepted therefrom and the desired digital video data Vdata is converted into a simulation signal in parallel and output.

Referring to FIG. 1*b*, in a data driving circuit of the display device of some embodiments of the present application, the comparison module CM includes two comparators Cn and Cn+1, a default grayscale value Rg is input to inverting input terminals of the two comparators $C_n$ and $C_{n+1}$, and non-inverting input terminals of the two comparators $C_n$ and $C_{n+1}$ are respectively connected to the corresponding pair of the data driving units LM(n) and LM(n+1).

Referring to FIG. 1*b*, in a data driving circuit of the display device of some embodiments of the present application, the comparison module CM further includes an OR gate and two inverters. Output terminals of the two comparators $C_n$ and $C_{n+1}$ are respectively connected to two input terminals of the OR gate through the inverters, and output terminals of the OR gate are connected to a control terminal of the switching transistor Ts.

Referring to FIG. 1c, in a data driving circuit of the display device of some embodiments of the present application, the comparison module CM further includes an AND gate and two inverters. The output terminals of the two comparators $C_n$ and $C_{n+1}$ are respectively connected to two input terminals of the AND gate through the inverters, and output terminals of the AND gate are connected to the control terminal of the switching transistor Ts.

Referring to FIG. 2c, in a data driving circuit of some embodiments of the present application, the comparison module CM is configured such that if a grayscale value of one of the digital video data Vdata is greater than a default grayscale value, the comparison module CM turns on the switching transistor Ts at an output interval of the analog video signals $gVA_n$ and $gVA_{n+1}$ so that the output terminals of the corresponding pair of the data driving units DU(n), DU(n+1) are connected for charge sharing. Wherein, ±Vg is a potential of the analog video signal corresponding to the default grayscale value. In an example of FIG. 2c, a grayscale value of the analog video signal $gVA_n$ is greater than the default grayscale value, and a pulse amplitude corresponding to the potential $gVA'_n$ is greater than- Vg. Therefore, charge sharing helps to reduce the power consumption of the data driving units DU(n), DU(n+1), so that a switching transistor of the charge sharing unit CSU does not operate excessively and provide more efficient power consumption control, thereby solving a problem of a power consumption and a heat generation of a chip in prior art.

Specifically, if the default grayscale value is too small, the switching transistor of the charge sharing unit CSU is excessively operated. If the default grayscale value is too large, then it does not help reduce the power consumption of the data driving units DU(n) and DU(n+1). Therefore, a range of the default grayscale value ranging from a grayscale 128 to a grayscale 196 can be selected to achieve a better balance and a lower heat generation.

Specifically, referring to FIGS. 1a and 3, the display panel PL further includes a gate driving circuit 300 and a plurality of gate lines GL connected to the gate driving circuit 300. The pixel array 200 includes a plurality of sub-pixels Px. The gate driving circuit 300 turns on a driving transistor in the sub-pixel Px of the pixel array 200 through the gate line GL to introduce analog video signals $VA_n$, $VA_{n+1}$ . . . from the data lines DLn, DLn+1 . . . , so that liquid crystals are rotated to different degrees to produce a grayscale display.

Referring to FIG. 1a, FIG. 2d, and FIG. 3, in a display device DP of some embodiments of the present application, the comparison module CM is configured to compare two digital video data Vdata stored in the corresponding pair of the data driving units DU(n) and DU(n+1). If grayscale values of two digital video data Vdata are larger than the default grayscale value, the comparison module CM turns on the switching transistor Ts during an output interval of the analog video signals $dVA_n$ and $dVA_{n+1}$ so that the output terminals of corresponding pair of the data driving units DU(n) and DU(n+1) are connected for charge sharing. Where, ±Vg is a potential of the analog video signal corresponding to the default grayscale value. In an example of FIG. 2d, the grayscale values of the analog video signals $dVA_n$ and $dVA_{n+1}$ are greater than the default grayscale value, and pulse amplitudes of corresponding potentials $dVA'_n$ $dVA'_{n+1}$ are larger than +Vg. Therefore, charge sharing helps to reduce the power consumption of the data driving units DU(n), DU(n+1), so that a switching transistor of the charge sharing unit CSU can be better avoided from operating excessively and can provide more efficient power consumption control, thereby solving a problem of power consumption and heat generation of a chip in prior art.

In a display device of some embodiments of the present application, the comparison module CM is configured such that if none of the grayscale values of the digital video data Vdata is greater than the default grayscale value, the comparison module CM turns off the switching transistor Ts, and output terminals of the corresponding pair of the data driving units DU(n), Du(n+1) do not share charge.

Referring to FIGS. la and 3, in a display device DP of some embodiments of the present application, the comparison module CM is configured to share charges at an interval before two analog video signals $VA_n$, $VA_{n+1}$ are output. Specifically, referring to FIG. 1a, the data driving unit DU(n) at each stage includes a register module RM(n) for receiving a digital video data Vdata, a digital-to-analog conversion module DAC for converting the digital video data Vdata into a simulation signal, an operational amplifier $OP_n$ for providing output impedance and circuit buffering, and an output transistor Tp for controlling synchronous outputs of the analog video signals $VA_n$, $VA_{n+1}$. Wherein, a data output enable signal DOE controls the output transistor Tp to perform synchronous outputs of the analog video signals $VA_n$, $VA_{n+1}$. Between two pulses of the data output enable signal DOE, the comparison module CM samples the analog video signals $VA_n$, $VA_{n+1}$ and determines whether to perform charge sharing. If the comparison module CM determines to perform charge sharing, the switching transistor Ts is turned on for charge sharing before sampled analog video signals $VA_n$, $VA_{n+1}$ is output.

Specifically, referring to FIGS. 1a and 3, in the display device DP of some embodiments of the present application, the charge sharing unit CSU further includes a starting module Str connected between the comparison module CM and the switching transistor Ts, and the control unit Tcon is configured to control the starting module Str to turn on at an output interval of the analog video signals $VA_n$ and $VA_{n+1}$.

Specifically, referring to FIG. 1b or FIG. 1c, the starting module Str includes, for example, an inverter and a starting transistor Tt. The control unit Tcon provides a data output enable signal DOE and controls the starting transistor Tt to be turned on at a low level between two pulses of the data output enable signal DOE, so that a signal of the comparison module CM can be sent to the switching transistor Ts to determine whether the switching transistor Ts is turned on.

In the display device DP of some embodiments of the present application, the data driving unit DU(n) at each stage further includes an inverter Inv for reversing the polarity of the analog video signal $VA_n$. Specifically, the inverter Inv inverses the polarity of the analog video signals $VA_n$, $VA_{n+1}$ based on an inversed signal POL.

In a data driving circuit and a display device provided in the present application, a comparison module of a charge sharing unit is configured to compare two digital video data stored in the corresponding pair of the data driving units, and if a grayscale value of one of the digital video data is greater than a default grayscale value, the comparison module turns on a switching transistor at the an output interval of an analog video signal to connect output terminals of the corresponding pair of the data driving units for charge sharing, so that the switching transistor does not excessively operate and provides more efficient power consumption control, thereby solving a problem of power consumption and heat generation of a chip in prior art.

For specific implementation of the above operations, refer to the foregoing embodiment, and details are not described herein.

In conclusion, although the present application has been disclosed in the above preferred embodiment, the above preferred embodiment is not intended to limit the present application. A person of ordinary skill in the art may make various changes and finishes without departing from the spirit and scope of the present application. Therefore, the scope of protection of the present application is subject to the scope defined by the claims.

What is claimed is:

1. A data driving circuit, wherein the data driving circuit comprises a plurality of cascaded data driving units and a plurality of charge sharing units; a data driving unit is configured to receive digital video data and output an analog video signal to a corresponding data line, the data driving unit at each stage comprises a latch module configured to store the digital video data, the plurality of cascaded data driving units are paired for providing a polarity inversed analog video signal; the charge sharing unit is disposed between each pair of the data driving units, each of the plurality of charge sharing units comprises a comparison module and a switching transistor; the comparison module is connected to the latch modules of a corresponding pair of data driving units and configured to compare the digital video data stored in the corresponding pair of the data driving units, the switching transistor is connected to output terminals of the corresponding pair of the data driving units, and an output terminal of the comparison module is connected to a control terminal of the switching transistor;

wherein the data driving circuit further comprises an output transistor, and a data output enable signal controls the output transistor to perform synchronous output of the digital video data; wherein the comparison module is further configured to sample the digital video data between two pulses of the data output enable signal and compare two digital video data stored in the corresponding pair of the data driving units; and the comparison module turns on the switching transistor before output of the digital video data sampled if a grayscale value of one of the digital video data is greater than a default grayscale value.

2. The data driving circuit according to claim 1, wherein the comparison module comprises two comparators, a default grayscale value is input to inverting input terminals of the two comparators, and non-inverting input terminals of the two comparators are respectively connected to the corresponding pair of the data driving units.

3. The data driving circuit according to claim 2, wherein the comparison module further comprises an OR gate and two inverters, output terminals of the two comparators are respectively connected to two input terminals of the OR gate through the inverters, and output terminals of the OR gate are connected to the control terminal of the switching transistor.

4. The data driving circuit according to claim 2, wherein the comparison module further comprises an AND gate and two inverters, output terminals of the two comparators are respectively connected to two input terminals of the AND gate through the inverters, and output terminals of the AND gates are connected to the control terminal of the switching transistor.

5. The data driving circuit according to claim 1, wherein the comparison module is configured to compare two digital video data stored in the corresponding pair of the data driving units, and the comparison module turns on the switching transistor if grayscale values of the two digital video data are both greater than the default grayscale value.

6. The data driving circuit according to claim 1, wherein the comparison module is configured to, if none of the grayscale values of the digital video data is greater than the default grayscale value, turn off the switching transistor, and the output terminals of the corresponding pair of the data driving units do not perform charge sharing.

7. A display device, wherein the display device comprises:

a control unit; and a display panel comprising a pixel array and a data driving circuit; wherein the control unit is connected to the data driving circuit for providing digital video data, the data driving circuit is connected to the pixel array for providing an analog video signal to the pixel array, the data driving circuit comprises a plurality of cascaded data driving units and a plurality of charge sharing units;

wherein a data driving unit is configured to receive the digital video data and output an analog video signal to a corresponding data line, the data driving unit at each stage comprises a latch module for storing the digital video data, the plurality of cascaded data driving units are paired for providing a polarity inversed analog video signal, the charge sharing unit is disposed between each pair of the data driving units, each of the plurality of charge sharing units comprises a comparison module and a switching transistor, the comparison module is connected to latch modules of a corresponding pair of data driving units and configured to compare the digital video data stored in the corresponding pair of the data driving units, the switching transistor is connected to output terminals of each pair of the data driving units, and an output terminal of the comparison module is connected to a control terminal of the switching transistor;

wherein the data driving circuit further comprises an output transistor, and a data output enable signal controls the output transistor to perform synchronous output of the digital video data; wherein the comparison module is further configured to sample the digital video data between two pulses of the data output enable signal and compare two digital video data stored in the corresponding pair of the data driving units; and the comparison module turns on the switching transistor before output of the digital video data sampled if a grayscale value of one of the digital video data is greater than a default grayscale value.

8. The display device according to claim 7, wherein the comparison module comprises two comparators, a default grayscale value is input to inverting input terminals of the two comparators, and non-inverting input terminals of the two comparators are respectively connected to the corresponding pair of the data driving units.

9. The display device according to claim 8, wherein the charge sharing unit further comprises a starting module connected between the comparison module and the switching transistor, and the control unit is configured to control the starting module to turn on during an output interval of the analog video signal.

10. The display device according to claim 8, wherein the comparison module further comprises an OR gate and two inverters, output terminals of the two comparators are respectively connected to two input terminals of the OR gate through the inverters, and output terminals of the OR gate are connected to the control terminal of the switching transistor.

11. The display device according to claim 8, wherein the comparison module further comprises an AND gate and two inverters, output terminals of the two comparators are respectively connected to two input terminals of the AND gate through the inverters, and output terminals of the AND gates are connected to the control terminal of the switching transistor.

12. The display device according to claim 7, wherein the comparison module is configured to compare two digital video data stored in the corresponding pair of the data driving units, and the comparison module turns on the switching transistor if grayscale values of the two digital video data are both greater than the default grayscale value.

13. The display device according to claim 7, wherein the comparison module is configured to, if none of the grayscale values of the digital video data is greater than the default grayscale value, turn off the switching transistor, and the output terminals of the corresponding pair of the data driving units do not perform charge sharing.

* * * * *